United States Patent [19]

Ward et al.

[11] 4,181,687

[45] Jan. 1, 1980

[54] BONDING THERMOPLASTIC RESINS

[75] Inventors: Robert J. Ward, Bridgewater; James H. Kawakami, Piscataway; Neil J. McCarthy, Jr., Warrenville, all of N.J.

[73] Assignee: Union Carbide Corporation, New York, N.Y.

[21] Appl. No.: 947,437

[22] Filed: Oct. 2, 1978

[51] Int. Cl.$^2$ .............................................. C08L 43/04
[52] U.S. Cl. .................................... 525/100; 428/247; 428/447; 428/461; 428/463; 428/464; 525/342; 525/101
[58] Field of Search .................. 260/825, 827; 528/11; 526/279, 29

[56] References Cited

U.S. PATENT DOCUMENTS

| 3,306,800 | 2/1967 | Plueddemann | 260/824 R |
|---|---|---|---|
| 4,043,953 | 8/1977 | Chang et al. | 260/827 |

OTHER PUBLICATIONS

Inoue et al., *Journal of Applied Polymer Science*, vol. 19, pp. 1939–1954, (1975).

*Primary Examiner*—Wilbert J. Briggs, Sr.
*Assistant Examiner*—John Wilson Jones
*Attorney, Agent, or Firm*—Stanley Ktorides

[57] ABSTRACT

Bonding between thermoplastic resins and inorganic oxide substrates is improved by providing to the resin/inorganic oxide interface as an adhesion promoter a combination of (a) a copolymer of an ethylenically unsaturated organic monomer and an unsaturated organosilane containing hydrolyzable groups; and (b) a monomeric hydrolytically reactive organosilane.

3 Claims, No Drawings

BONDING THERMOPLASTIC RESINS

BACKGROUND OF THE INVENTION

A relatively recent development in the field of coatings and adhesives has been the development of a class of materials which we shall refer to as polymeric organosilanes. These materials comprise organic polymer backbones having hydrolytically reactive silyl groups pendent therefrom. These types of compounds can be conveniently produced by copolymerizing ethylenically unsaturated organic monomers, e.g. ethyl acrylate, vinyl acetate, and the like, with ethylenically unsaturated organosilane monomers having hydrolytically reactive groups bonded to the silicon, e.g. vinyltrimethoxysilane, γ-methacryloxypropyltrimethoxysilane and the like. Examples of such copolymerized organosilanes are found in U.S. Pat. Nos. 3,408,420; 3,306,800; 3,542,585; 3,962,471; 3,062,242; and 3,577,399.

The polymeric organosilanes described above have been used as coating materials which displayed improved adhesion to inorganic oxide substrates by comparison to similar organic polymers containing no silyl groups. It has also been suggested that polymeric organosilanes be employed as adhesion promoters (i.e. coupling agents) to improve the bonding between a resinous medium and an inorganic substrate or filler (see, e.g., U.S. Pat. No. 3,306,800 and Inoue et al., *J. Applied Polymer Sci.*, Vol. 19, pp. 1939–1954(1).

It has been further suggested that such polymeric organosilanes might impart bonding strength which is superior to that imparted by conventional monomeric silane coupling agents when employed in conjunction with non-reactive thermoplastic resins. Conventional monomeric silane coupling agents generally consist of silanes containing at least one reactive organic group and at least one hydrolyzable group bonded to the silicon atom. The monomeric silane coupling agents rely largely on the reactivity of their organic groups with coreactive organic groups in the resin matrix to provide bonding, hence, they do not function well in conjunction with resins such as thermoplastics containing no reactive groups. Polymeric organosilanes would be expected to provide improved bonding with thermoplastic resins due to the compatibility of the organic polymer portion with the thermoplastic resin matrix.

While polymeric organosilanes indeed provide improved bonding between thermoplastic resins and inorganic oxide substrates, it is clear that relatively high levels of silane monomer, on the order of 20 to 25 mole %, must be copolymerized in the polymeric organosilane in order to achieve optimum bond strength. Employing these high levels of silane, however, can cause problems for a number of reasons. From an economic standpoint, the silane is a relatively costly material, thus, considerable economic benefit would be obtained if the silane content of the polymeric organosilane could be reduced without loss of adhesive strength. Moreover, high levels of silane in the polymeric organosilane tend to make it unstable and reduce its potlife. This latter phenomenon is due to hydrolytic crosslinking reactions which occur at the silyl groups of the polymeric organosilane and can cause unacceptable increases in viscosity and even gelation when the material is exposed to ambient moisture. The high levels of silane which have been required in the prior art to optimize bond strength when the polymeric organosilane is employed as an adhesion promoter unfortunately increase the likelihood of premature cross-linking of the polymeric organosilane.

SUMMARY OF THE INVENTION

This invention relates to improved methods of bonding thermoplastic resins to inorganic oxide substrates using polymeric organosilanes. In accordance with the teachings of this invention, excellent wet bond strength can be achieved using relatively low levels of silane in the polymeric organosilane. In addition to the improved methods of this invention there are provided improved thermoplastic resin compositions which are applicable to inorganic oxide substrates to form composites exhibiting outstanding wet bond strength.

This invention is based on the discovery that when a monomeric hydrolytically reactive silane is employed in conjunction with the polymeric organosilane as an adhesion promoter additive in a thermoplastic resin, excellent wet bond strength was obtained at much lower overall levels of silane than were necessary when using the polymeric organosilane alone as an adhesion promoter.

There is provided, in accordance with the teachings of this invention, a thermoplastic resin composition which displays outstanding wet bond strength to inorganic oxide substrates which comprises: (a) a thermoplastic resin, (b) a polymeric organosilane and (c) a monomeric hydrolytically reactive organosilane.

There are also provided herein improved methods of bonding a thermoplastic resin to an inorganic oxide substrate. In one embodiment of the invention a polymeric organosilane and a monomeric hydrolytically reactive organosilane are admixed with a thermoplastic resin and the composition thus formed is then applied to an inorganic oxide substrate. In another embodiment, a primer composition containing the polymeric organosilane and monomeric hydrolytically reactive organosilane is first applied to an inorganic oxide substrate and the thermoplastic resin is thereafter applied to the inorganic oxide substrate having the primer on its surface.

DETAILED DESCRIPTION OF THE INVENTION

The polymeric organosilane employed in the compositions of this invention is a copolymer having polymerized therein:

(1) at least one ethylenically unsaturated organic monomer containing at least one group of the formula $>C=C<$; and (2) at least one unsaturated organosilane monomer of the formula $RSiX_nR'_{(3-n)}$ wherein R is a monovalent organic radical containing a vinyl group, i.e. $CH_2=C<$, X is a hydrolyzable group, R' is a monovalent hydrocarbon radical containing up to 10 carbon atoms and is preferably alkyl, and n is an integer from 1 to 3, preferably 3. The hydrolyzable groups represented by X in the formula above are chosen from the group consisting of alkoxy of 1 to 4 carbon atoms, alkoxyalkoxy containing up to about 6 carbon atoms, acryloxy of 2 to about 4 carbon atoms, phenoxy, and oxime. Illustrative unsaturated organosilane monomers are gamma-methacryloxypropyltrimethoxysilane, vinyl triethoxysilane, vinyl tris(2-methoxyethoxy) silane, and the like.

The ethylenically unsaturated organic monomer is preferably chosen to provide compatibility between the polymeric organosilane and the thermoplastic resin. In terms of producing polymeric organosilanes, having the desired compatibility with a fairly broad range of thermoplastic resins, preferred ethylenically unsaturated organic monomers are alkyl esters or alpha, beta-ethylenically unsaturated carboxylic acids, e.g. alkyl acrylates such as methyl acrylate, ethyl acrylate, propyl acrylate, butyl acrylate, hexyl acrylate, and 2-ethylhexyl acrylate and alkyl methacrylates such as methyl methacrylate, butyl methacrylate, 2-ethylhexyl methacrylate, and lauryl methacrylate; vinyl aromatic hydrocarbons such as styrene, vinyl toluene, alpha-methyl styrene, and the like; vinyl halides and vinylidene halides such as vinyl chloride and vinylidene chloride; and vinyl esters of saturated fatty acids such as vinyl propionate, vinyl acetate, and the like.

The polymeric organosilane can contain anywhere from about 75 to 95 mole percent, preferably 80 to 95 mole percent, of the ethylenically unsaturated organic monomer polymerized therein and from about 5 to 25 mole percent, preferably 5 to 20 mole percent, of the unsaturated organosilane polymerized therein. It is an object of this invention, however, to provide excellent bond strength at relatively low levels of silane. In this regard, it is preferred to use as little of the organosilane as is consistent with good bond strength.

The second component, which is employed in conjunction with the polymeric organosilane as an adhesion promoter, is the monomeric hydrolytically reactive organosilane. The monomeric hydrolytically reactive organosilane can be the same as or different from the unsaturated organosilane monomer which is copolymerized with the ethylenically unsaturated organic monomer to produce the polymeric organosilane.

For example, the polymeric organosilane can be a copolymer of methyl methacrylate and gamma-methacryloxypropyltrimethoxysilane and the monomeric hydrolytically reactive organosilane gamma-methacryloxypropyltrimethoxysilane; or the polymeric organosilane can be a copolymer of methyl methacrylate and gamma-methacryloxypropyltrimethoxysilane and the monomeric hydrolytically reactive organosilane ethyltriethoxysilane.

The monomeric hydrolytically reactive organosilane has the formula $R''_{(4-x)}SiX_x$ wherein X is a hydrolyzable group, R'' is a monovalent organic radical of from 1 to 12 carbon atoms, which may or may not contain a functional organic group, and x is an integer having a value from 1 to 4, and is preferably 3 or 4. R'' can be, merely by way of example, alkyl, aryl, alkenyl, cycloalkyl, aralkyl, acryloxy, methacryloxy, amino, or epoxy. The hydrolyzable group represented by X can be any of those previously mentioned as hydrolyzable groups in the unsaturated organosilane. While the X groups, i.e. hydrolyzable groups, of the monomeric hydrolytically reactive organosilane can be different from the X groups of the polymeric organosilane, it is preferred that the respective X groups be selected to have similar hydrolytic reactivity, that is, rates of hydrolysis. Those skilled in the art are familiar with the relative rates of hydrolysis of hydrolyzable groups or they can be determined without undue experimentation. For example, it is known that methoxy groups are more readily hydrolyzed than ethoxy groups. Most preferably, the X groups of the monomeric hydrolytically reactive organosilane and the X groups of the polymeric organosilane are the same.

As merely illustrative of suitable monomeric hydrolytically reactive organosilane one can mention the following:

CH$_3$CH$_2$Si(OCH$_2$CH$_3$)$_3$
CH$_2$=CHSi(OCH$_2$CH$_3$)$_3$

(CH$_3$)$_2$Si(OCH$_2$CH$_3$)$_2$
CH$_3$Si(OCH$_3$)$_3$
CH$_3$Si(OCH$_2$CH$_3$)$_3$
CH$_2$=Si(OCH$_3$)$_3$

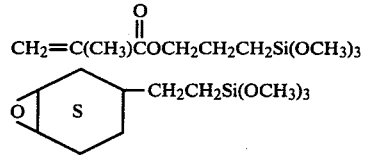

H$_2$NCH$_2$CH$_2$CH$_2$Si(OCH$_2$CH$_3$)$_3$
H$_2$NCH$_2$CH$_2$NHCH$_2$CH$_2$Si(OCH$_3$)$_3$

As disclosed in our copending application, U.S. Ser. No. 925,844, filed July 17, 1978, we have found that the polymeric organosilanes used herein may be stabilized against gelation prior to use by the presence of monomeric hydrolytically reactive organosilane and an alkyl alcohol. While the alkyl alcohol is not necessary to improve the bonding of the thermoplastic resin in accordance with the present invention, its presence as a stabilizing additive to the polymeric organosilane in no way hinders the adhesion promoting effect. Hence, it is within the scope of this invention to have alkyl alcohol present in addition to the polymeric organosilane and monomeric hydrolytically reactive organosilane.

In accordance with the teachings of this invention, improved bonding between a thermoplastic resin and an inorganic oxide substrate is achieved by providing the polymeric organosilane and the monomeric hydrolytically reactive organosilane to the thermoplastic resin/inorganic oxide interface.

In one embodiment of the invention the polymeric organosilane and monomeric hydrolytically reactive organosilane are supplied directly to the thermoplastic resin, whereby a significant portion thereof migrates through the resin to the resin/inorganic oxide interface. If desired, the polymeric organosilane and monomeric hydrolytically reactive organosilane can be provided to the resin as a solution in an inert organic solvent such as toluene. Usually, it is desirable that the resin be in the form of a solution in an organic solvent or that the resin be in the melt stage at the time of mixing with the polymeric organosilane and monomeric hydrolytically reactive organosilane in order to facilitate mixing.

The thermoplastic resin containing the polymeric organosilane and monomeric hydrolytically reactive organosilane therein as an adhesion promoter is applied to an inorganic oxide surface. The inorganic oxide surface may be, by way of example, a continuous surface or it may be in the form of a particulate or fibrous filler.

In bonding the resin composition containing the polymeric organosilane and monomeric hydrolytically reactive organosilane to the inorganic oxide substrate the resin is applied to the inorganic oxide substrate while the resin is in a flowable, i.e. plastic, condition. This condition can be achieved either by heating the resin composition to a temperature above the melting point of the resin or by providing the resin in the form of a solution in any conventional organic solvent, e.g. toluene, methyl ethyl ketone, and the like. After the resin composition has been applied to the inorganic oxide material, the resin is then solidified, either by cooling the resin below its melting point or by evaporating the solvent.

Another convenient method providing the polymeric organosilane and monomeric hydrolytically reactive organosilane to the thermoplastic resin/inorganic oxide interface is by applying them as a primer coating to the inorganic oxide surface prior to bringing the inorganic oxide into contact with the thermoplastic resin. Normally, the polymeric organosilane and monomeric hydrolytically reactive organosilane will be provided as a primer in the form of a solution in a conventional inert organic solvent such as toluene, methyl ethyl ketone, etc.

The amount of polymeric organosilane and monomeric hydrolytically reactive organosilane which is provided to the thermoplastic resin/inorganic oxide interface to improve bonding can vary considerably. When the polymeric organosilane and monomeric hydrolytically reactive organosilane are applied to the inorganic oxide surface as a primer, a thin coating is preferred in order to prevent the formation of a weak boundary layer. When the polymeric organosilane and monomeric hydrolytically reactive organosilane are supplied directly to the thermoplastic resin, it is preferred that the polymeric organosilane be provided in an amount which is equal to at least about 0.05 weight percent, based on the weight of the resin.

There is no strict upper limit on the amount of polymeric organosilane which can be employed. However, there is in no event any particular advantage to be gained in employing the polymeric organosilane at a concentration exceeding about 10% by weight of the thermoplastic resin.

The amount of monomeric hydrolytically reactive organosilane used in conjunction with the polymeric organosilane is that which will enhance the ability of the polymeric organosilane to impart wet bonding strength. Typically, we employ the monomeric hydrolytically reactive organosilane at concentrations of at least 5 mole percent, based on the number of moles of polymerized unsaturaged organosilane which are present in the polymeric organosilane, however, it is within the scope of the invention to employ as little as 0.1 mole percent of the monomeric hydrolytically reactive organosilane, based on the number of moles of polymerized unsaturated organosilane which are present in the polymeric organosilane.

It is preferred not to employ the monomeric hydrolytically reactive organosilane at concentrations exceeding about 100 mole percent, based on the number of moles of polymerized unsaturated organosilane present in the polymeric organosilane. We have found that when the concentration of monomeric hydrolytically reactive organosilane is increased beyond this level, bonding strength becomes erratic and, at concentrations substantially in excess of 100% wet bonding strength drops off to virtually nil.

The concentration of monomeric hydrolytically reactive organosilane which is employed in conjunction with the polymeric organosilane is specified above as a mole percentage of the polymerized unsaturated organosilane which is present in the polymeric organosilane. For example, if one employs, as the polymeric organosilane, a copolymer which is produced by copolymerizing 4 mol. parts methyl methacrylate (formula molecular weight=100) and 1 mol. part gamma-methacryloxypropyltrimethoxysilane (formula molecular weight=248), then a concentration of monomeric hydrolytically reactive organosilane which is specified as 100% indicates that 1 gram-mole of monomeric hydrolytically reactive organosilane is employed for each 648 grams of polymeric organosilane; a concentration of 10% indicates that 0.1 gram mole of monomeric hydrolytically reactive organosilane is employed for each 648 grams of polymeric organosilane; etc. Similarly, if the polymeric organosilane is a copolymer of 9 mol. parts methyl methacrylate and 1 mol. part gamma-methacryloxypropyltrimethoxysilane, then a concentration of monomeric hydrolytically reactive organosilane specified as 100% indicates that 1 gram-mole of monomeric hydrolytically reactive organosilane is employed for each 1,148 grams of polymeric organosilane.

The polymeric organosilane and monomeric hydrolytically reactive organosilane can be employed in conjunction with any convention thermoplastic resin with which the polymeric organosilane is compatible. As will be recognized by those skilled in the art, a thermoplastic resin is any organic polymer, copolymer, terpolymer, etc., which can be heated above its melting point and then resolidified by cooling below its melting point without undergoing any substantial change in properties.

Merely by way of example, one can mention as useful thermoplastic resins polyolefins such as polyethylene, polypropylene, polyisobutylene and the like; polymers of alkyl esters of alpha, beta ethylenically unsaturated carboxylic acids such as methyl acrylate, methyl methacrylate, ethyl acrylate, ethyl methacrylate, and the like; vinyl esters of saturated fatty acids such as vinyl acetate, vinyl propionate, and the like; polyvinyl halides and polyvinylidene halides such as polyvinyl chloride and polyvinylidene chloride; polystyrene; polymers of conjugated dienes such as polybutadiene; cellulose ethers and esters; thermoplastic polyesters; polyvinyl ethers; polyvinyl acetal; styrenebutadiene copolymers, etc.

While it is contemplated that the benefits of this invention will be realized primarily in conjunction with thermoplastic resins, some advantages may be obtained by using the monomeric hydrolytically reactive organosilane and the polymeric organosilane as adhesion promoting additives in thermosetting resins such as unsaturated polyesters, epoxies, and crosslinked polyurethanes.

By "inorganic oxide" substrate is meant any inorganic solid material which possesses either oxygen (chemisorbed or covalently bonded) or hydroxyl (bonded or free) at its exposed surface. Specific illustrations of suitably employed inorganic oxide materials are, for example, iron, aluminum, or steel (oxidized at its surface), alumina, alumina trihydrate, brass (oxidized at its surface), copper metal (oxidized at its surface), siliceous materials such as fumed silica, hydrated silica (precipitated silica), silica, silica aerogels, silica xerogels, aluminum silicates, calcium magnesium silicate, asbestos, glass fibers, clays, molecular sieves, Wallostonite, calcium carbonate, titanium dioxide, calcium sulphate, magnesium sulfate, and the like.

It was quite a surprising finding that the use of a monomeric hydrolytically reactive organosilane in conjunction with the polymeric organosilane caused excellent wet bond strength to be achieved at relatively low overall concentration levels of silane. When a polymeric organosilane consisting of a copolymer of methyl methacrylate and gamma-methacryloxypropyltrimethoxysilane was employed as the sole adhesion promoter additive in a vinyl acetate/vinyl chloride copolymer, the wet bond strength of the resin to aluminum underwent a steady decrease as the proportion of silane in the polymeric organosilane was decreased. When monomeric hydrolytically reactive organosilane was employed in conjunction with the polymeric organosilane, the proportion of silane copolymerized in the polymeric organosilane could be reduced without significantly adversely affecting wet bond strength.

The degree of improvement in bonding strength which is achieved by using the monomeric hydrolytically reactive organosilane in conjunction with the polymeric organosilane varies somewhat depending on the particular thermoplastic resin and inorganic oxide substrate employed. For example, in thermoplastic vinyl resins, such as vinyl acetate/vinyl chloride copolymers, the use of monomeric hydrolytically reactive organosilane and polymeric organosilane together produced significantly better wet bond strength than the polymeric organosilane alone. Moreover, the improvement in bond strength was noted for all the polymeric organosilanes employed, regardless of their silane content.

By comparison, with a thermoplastic polyurethane, the observed improvement in wet bond strength which resulted from having the monomeric hydrolytically reactive organosilane present was only significant when the polymeric organosilane contained a rather low level of polymerized silane. Nevertheless, a primary objective of this invention is achieved by allowing the obtainment of good bond strength using a polymeric organosilane which has a relatively low silane level, since the lower silane level renders the polymeric organosilane more stable against hydrolytic crosslinking.

The examples which follow are intended to further illustrate the invention and are not intended to limit its scope in any way

EXAMPLE 1

In order to illustrate the effect of the silane level in a polymeric organosilane on bond strength, a series of four polymeric organosilanes were prepared by copolymerizing, in toluene, methyl methacrylate and gamma-methacryloxypropyltrimethoxysilane to an approximate weight average molecular weight of 20,000 (56% solids). The proportion of gamma-methacryloxypropyltrimethoxysilane in the copolymer varied from 5 mole percent to 20 mole percent. The polymeric organosilanes were each blended with a solution copolymer of 86 wt. % vinyl chloride, 14 wt. % vinyl acetate (20% solids in methyl ethyl ketone, viscosity 50 cps. at 25° C.) at concentrations of 1% and 2% by weight polymeric organosilane. The resins containing the various polymeric organosilanes were employed as adhesives to bond canvas to aluminum. The canvas/aluminum laminates were soaked in water at 25° C. for one week. While the laminates were still wet they were tested for 180° peel strength. The results appear in the following table.

| Polymeric organosilane MMA/A-174 mole ratio* | Wet bond strength, lb./in.** | |
|---|---|---|
| | 1% | 2% |
| 4/1 | 9 | 29 |
| 9/1 | 8 | 17 |
| 15/1 | 5 | 10 |
| 19/1 | 0.1 | — |

*MMA = methyl methacrylate
A-174 = gamma-methacryloxypropyltrimethoxysilane
**Average of four repetitive tests The above date illustrates the strong relationship between the amount of silane polymerized in the polymeric organosilane and the wet bond strength when the polymeric organosilane alone is employed as an adhesion promoter.

The following examples illustrate the effect of using a monomeric hydrolytically reactive organosilane in conjunction with a polymeric organosilane as an adhesion promoter in the thermoplastic resin.

A series of canvas to aluminum bonds were prepared and tested in a manner similar to the previous examples, using 1% polymeric organosilane, based on the weight of the resin, except that varying amounts of gamma-methacryloxypropyltrimethoxysilane monomer were also blended into the resin. Wet bond strengths of the canvas/aluminum composites are given in the table below.

| Polymeric organosilane, MMA/A-174 mole ratio | A-174 monomer, %* | Wet bond strength lb./in.** |
|---|---|---|
| 4/1 | 13 | 18 |
| 9/1 | 23 | 25 |
| 15/1 | 35 | 22 |
| 19/1 | 43 | 27 |

*Mole %, based on moles of A-174 in the polymeric organosilane (equals 5 wt. %, based on wt. of polymeric organosilane)
**Average of four repetitive tests The results of these examples are in dramatic contrast to the previous examples in which the polymeric organosilane was employed as the sole adhesion promoter. When the monomeric hydrolytically reactive organosilanes were employed in conjunction with the polymeric organosilane, the amount of silane in the polymeric organosilane could be substantially reduced without loss of bond strength. Moreover, the total amount of A-174, both in the form of monomeric A-174 and in the polymeric organosilane, could be substantially reduced without loss of bond strength. The ability to reduce the silane content of the polymeric organosilane without loss of bonding performance represents a considerable advance in the art, since a 19/1 mole ratio MMA/A-174 copolymer presents less viscosity stability problems than a 4/1 mole ratio MMA/A-174 copolymer and, therefore, is expected to be more shelf-stable and have a longer potlife.

For purposes of comparison, A-174 monomer alone was employed at a 1% level in the same vinyl chloride/vinyl acetate resin system used above and tested for wet bonding strength in canvas/aluminum composites. Wet bond strength, in four repetitive tests, averaged 0.2 lb./in. This confirms that monomeric reactive silanes, which are excellent coupling agents in reactive thermosetting polymer systems, do not provide good wet bonding when employed as coupling agents in nonreactive thermoplastic resin systems.

EXAMPLE 2

A series of polymeric organosilanes were produced by copolymerizing methyl methacrylate and A-174 in toluene to a molecular weight of 20,000 (56% solids). The molar ratio of methyl methacrylate to A-174 in the polymer varied as indicated in the table below. The polymeric organosilanes were blended with a solution copolymer of 86 wt.% vinyl chloride, 14 wt.% vinyl acetate (20% solids in methyl ethyl ketone, viscosity 50 cps. at 25° C.) at a concentration of 1% by weight polymeric organosilane. There were also blended with the solution copolymer varying amounts of A-174 monomer as indicated in the table below. The resins containing the polymeric organosilane and A-174 were employed as adhesives to bond canvas to aluminum. The canvas/aluminum laminates were soaked in water at 25° C. for one week. The laminates were removed from the water and tested for 180° peel strength while still wet. Results, which represent average values for four repetitive tests, are represented in the table.

| Polymeric organosilane MMA/A-174 mole ratio | A-174 added, mole %[1] | Wet bond strength lb./in. |
| --- | --- | --- |
| 4/1 | 0 | 9.5 |
| 4/1 | 13 | 17.8 |
| 4/1 | 33 | 15.3 |
| 4/1 | 65 | 21.8 |
| 4/1 | 131 | 0.1 |
| 9/1 | 0 | 7.9 |
| 9/1 | 23 | 25.1 |
| 9/1 | 58 | 22.9 |
| 9/1 | 116 | 8.0 |
| 15/1 | 0 | 6.0 |
| 15/1 | 35 | 22.5 |
| 15/1 | 88 | 14.5[2] |
| 15/1 | 176 | 18.2[3] |
| 19/1 | 0 | 0.1 |
| 19/1 | 43 | 27.6 |
| 19/1 | 108 | 0.1 |
| 19/1 | 216 | 0.1 |

[1]Based on moles of A-174 in the polymeric organosilane
[2]Values ranged from 7-25 lb./in.
[3]Values ranged from 7-30 lb./in.

EXAMPLE 3

In this example, a polymeric organosilane and a monomeric hydrolytically reactive organosilane were applied in the form of a primer coating to aluminum preparatory to the application of a hot melt adhesive. The polymeric organosilane employed was a copolymer of 15 mol. parts methyl methacrylate and 1 mol. part gamma-methacryloxypropyltrimethoxysilane. A primer solution was prepared consisting of toluene; 0.5 weight percent, based on the weight of the toluene, of the polymeric organosilane; 10 p.p.m. of dibutyltin dilaurate catalyst to catalyze reaction of the polymeric organosilane with the metal surface; and 6 weight percent A-174 monomer, based on the weight of polymeric organosilane (equivalent to 42 mole percent A-174 monomer when calculated on the basis of total moles of polymerized A-174 in the polymeric organosilane). As a control, a second primer solution was prepared in a similar manner with the exception that no A-174 monomer was present in the solution.

A group of 3 in. by 4 in. annodized aluminum plates were dipped in each primer solution for several seconds. The primed plates were allowed to stand for 5 days at room temperature. The plates were then dipped in toluene to remove any unreacted material from the surface and allowed to dry. There was then applied to each plate a 10-mil film of a thermoplastic adhesive consisting of equal parts of rosin ester (supplied commercially under the trade name Stabilyte Ester Ten) and ethylene/ethyl acrylate copolymer (23 wt. % ethyl acrylate). The adhesive was applied at 175° C. and was pressed between the aluminum plate and a strip of canvas at a pressure of 200 p.s.i. Half the samples were subjected to pressure for 30 seconds and the remaining samples for one minute.

When the adhesive had cooled to room temperature, the canvas/aluminum laminates were immersed in tap water for 5 days. The laminates were then tested, while still wet, for 180° peel strength. The results appear in the table below. The letters A and C following the peel strengths, indicate adhesive and cohesive modes of failure, respectively. The ranges given represent ranges of peel strength in a series of four repetitive tests. For the samples which were bonded using one minute of bonding pressure, the results show clearly that the samples containing A-174 monomer in addition to the polymeric organosilane imparted greater wet bond strength than the control samples which did not contain A-174. For the samples which were bonded using 30 seconds of bonding pressure, those samples which contained A-174 monomer in the priming solution more consistently produced bond strengths exceeding 12 lb./in. than those which did not contain A-174 in the priming solution. Further, in all instances where A-174 monomer was present in the priming solution, bond failure was in the cohesive mode; that is, failure did not occur at the aluminum/adhesive interface, but rather, failure occurred in the resin matrix itself. In instances where there was no A-174 in the priming solution in addition to the polymeric organosilane, failure was predominantly in the adhesive mode, that is, at the aluminum/adhesive interface.

| Bonding pressure time, min. | A-174 Silane monomer added | Peel strength, lb./in. |
| --- | --- | --- |
| 0.5 | No | 13-15(C),3-10(A*) |
| 0.5 | Yes | 12-16(C) |
| 1.0 | No | 2-10(A) |
| 1.0 | Yes | 12-20(C) |

*Failure was partially adhesive, partially cohesive

What is claimed is:

1. An improved thermoplastic resin composition, having excellent bond strength with inorganic oxide substrates, comprising:
   (A) a thermoplastic resin;
   (B) from about 0.05 to about 10 weight percent, based on the weight of said thermoplastic resin (A) of a copolymer having polymerized therein (i) from 75 to 95 mole percent of at least one ethylenically unsaturated organic monomer and (ii) from 5 to 25 mole percent of at least one unsaturated organosilane monomer of the formula $RSiX_nR'_{(3-n)}$ wherein R is a monovalent organic radical containing a vinyl group, R' is a monovalent hydrocarbon radical containing up to 10 carbon atoms, n is a integer from 1 to 3, and X is a hydrolyzable group chosen from the group consisting of alkoxy of 1 to 4 carbon atoms, alkoxyalkoxy containing up to 6 carbon atoms, acyloxy of 2 to 4 carbon atoms, phenoxy, and oxime; and (C) from about 0.1 to about 100 mole percent, based on the number of moles of polymerized unsaturated organosilane present in the copolymer component (B) of a monomeric hydrolytically reactive organosilane of the formula $R''_{(4-x)}SiX_x$ wherein X is a hydrolyzable group as previously defined, R'' is a monovalent organic radical of from 1 to 12 carbon atoms and x is a integer having a value of from 1 to 4.

2. Composition as claimed in claim 1, wherein said monomeric hydrolytically reactive organosilane is present at a concentration of from 5 to 100 mole percent, based on the number of moles of polymerized unsaturated organosilane present in the copolymer component (B).

3. Composition as claimed in claim 1, wherein said copolymer comprises a copolymer of methyl methacrylate and gamma-methacryloxypropyltrimethoxysilane.

* * * * *